US012608042B2

(12) United States Patent
Doglio et al.

(10) Patent No.: US 12,608,042 B2
(45) Date of Patent: Apr. 21, 2026

(54) DOCKING SYSTEM AND METHOD FOR DOCKING A HANDHELD DEVICE

(71) Applicant: Dell Products L.P., Round Rock, TX (US)

(72) Inventors: Jean Marie Doglio, Round Rock, TX (US); Paul Lalinde, Spring, TX (US); Chih-Ping Chang, Taipei (TW); Yongook Guack, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 224 days.

(21) Appl. No.: 18/167,130

(22) Filed: Feb. 10, 2023

(65) Prior Publication Data

US 2024/0272672 A1 Aug. 15, 2024

(51) Int. Cl.
*G06F 1/16* (2006.01)

(52) U.S. Cl.
CPC .......... *G06F 1/1632* (2013.01); *G06F 1/1654* (2013.01)

(58) Field of Classification Search
CPC ..... G06F 1/1632; G06F 1/1613; G06F 1/1654
See application file for complete search history.

(56) References Cited

U.S. PATENT DOCUMENTS

| | | | | |
|---|---|---|---|---|
| 9,651,993 | B2 * | 5/2017 | Huang | G06F 3/0202 |
| 9,727,092 | B1 * | 8/2017 | Gerbus | G06F 1/1681 |
| 10,061,353 | B2 * | 8/2018 | Lo | H01R 13/639 |
| 11,171,449 | B2 * | 11/2021 | Hirose | H01R 13/629 |

| | | | | |
|---|---|---|---|---|
| 2007/0047198 | A1 * | 3/2007 | Crooijmans | G06F 1/1632 |
| | | | | 361/679.41 |
| 2012/0045931 | A1 * | 2/2012 | Carnevali | G06F 1/1632 |
| | | | | 439/544 |
| 2012/0161706 | A1 * | 6/2012 | Zhou | G06F 1/1632 |
| | | | | 320/115 |
| 2012/0162902 | A1 * | 6/2012 | Zhou | H01R 13/635 |
| | | | | 361/679.41 |
| 2013/0163186 | A1 * | 6/2013 | Mizusawa | H04R 5/04 |
| | | | | 361/679.41 |
| 2014/0097793 | A1 * | 4/2014 | Wurtz | H02J 7/0044 |
| | | | | 320/108 |
| 2015/0098184 | A1 * | 4/2015 | Tsai | G06F 1/1632 |
| | | | | 361/679.56 |
| 2017/0117729 | A1 * | 4/2017 | Hirose | G06F 1/1632 |
| 2017/0302024 | A1 * | 10/2017 | Morrison | G06F 1/1632 |
| 2018/0136695 | A1 * | 5/2018 | Lo | H02J 7/0044 |
| 2021/0271291 | A1 * | 9/2021 | Keene | H01R 13/6205 |
| 2022/0019262 | A1 * | 1/2022 | Kamata | G06F 1/1632 |
| 2022/0399672 | A1 * | 12/2022 | Telesco | B60R 16/02 |

* cited by examiner

*Primary Examiner* — Nidhi Thaker
(74) *Attorney, Agent, or Firm* — McDermott Will & Schulte LLP

(57) ABSTRACT

A docking system comprises a handheld device and a dock that are configured for preventing or minimizing damage to a device connector and/or a dock connector during docking. The dock has a cap that can be retracted, wherein the dock connector is recessed until the cap is retracted. The device housing has a device recess complementary to the cap, a device connector opening for access to the device connector and pin recesses for receiving a set of pins. The device recess and cap facilitate alignment of the set of pins relative to the pin recesses, wherein retracting the cap causes the set of pins to extend through pin openings into the pin recesses. The set of pins resist movement and rotation of the base housing relative to the cap and further assist in aligning the device connector with the dock connector.

17 Claims, 9 Drawing Sheets

100

DOCKING SYSTEM AND METHOD FOR DOCKING A HANDHELD DEVICE

BACKGROUND

Field of the Disclosure

This disclosure relates generally to information handling systems and, more particularly, to docking systems and methods for docking handheld devices.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Embodiments may be generally directed to a docking system comprising a dock and a handheld device. The dock may comprise a dock connector, a set of pins, a cap comprising a set of pin openings, a dock connector opening for access to the dock connector and a spring configured with a spring constant to bias the cap such that the dock connector is recessed in the cap. The handheld device may comprise a device connector and a device housing comprising a device connector opening for access to the device connector and a set of pin recesses for receiving the set of pins.

In some embodiments, the spring is configured with the spring constant to bias the cap such that the set of pins are flush with the set of pin openings when no force is applied. In some embodiments, the spring is configured such that a force compresses the spring to retract the cap a first distance to cause the set of pins to extend at least partially through the set of pin openings. In some embodiments, the spring is configured with the spring constant such that the force compresses the spring to retract the cap a second distance to cause the dock connector to extend at least partially through the dock connector opening. In some embodiments, the spring is configured with the spring constant such that the force compresses the spring to retract the cap a third distance to cause the dock connector to extend at least partially through the device connector opening. In some embodiments, the spring is configured with the spring constant such that the force compresses the spring to retract the cap a fourth distance and connects the device connector to the dock connector. In some embodiments, each pin of the set of pins comprises a tapered end.

In some embodiments, one or more of the dock and the handheld device further comprises a set of visual features for aligning the device housing relative to the cap. In some embodiments, the set of visual features for aligning the device housing relative to the cap comprises one or more of a display side edge and a dock side edge, wherein aligning the device housing relative to the cap comprises aligning the display side edge relative to the dock side edge. In some embodiments, the device housing comprises a device recess for receiving the cap.

Embodiments may be directed to a method for connecting a device connector in a handheld device with a dock connector in a dock. The method may comprise positioning a device housing of the handheld device relative to a cap in a slot in the dock and applying a force to cause a cap to retract a distance such that a set of pins extend through a set of pin openings and into a set of pin recesses and cause a dock connector to extend through a dock connector opening and a device connector opening to connect the device connector to the dock connector. The cap may comprise the dock connector opening for accessing the dock connector. The dock may further comprise the set of pins, the set of pin openings and a spring configured to bias the cap such that the dock connector is recessed in the cap. The device housing may comprise the set of pin recesses and the device connector opening for accessing the device connector.

In some embodiments, applying the force comprises applying a first force to retract the cap a first distance to cause the set of pins to extend through the set of pin openings and at least partially into the set of pin recesses in the device housing, applying a second force to retract the cap a second distance to cause the dock connector to extend through the dock connector opening and into the device connector opening, and applying a third force to retract the cap a third distance to cause the device connector to connect to the dock connector. In some embodiments, the spring is configured with the spring constant selected such that a weight of the handheld device applies the first force. In some embodiments, the spring is configured with the spring constant selected such that the weight of the handheld device applies the second force. In some embodiments, the spring is configured with the spring constant selected such that the weight of the handheld device applies the third force. In some embodiments, the spring is configured with a spring constant selected for positioning the cap with the set of pins not extending from the set of pin openings when the device housing is not positioned on the cap. In some embodiments, the device housing comprises a device recess, wherein positioning the device housing in the slot comprises positioning the cap in the device recess.

BRIEF DESCRIPTION OF THE DRAWINGS

For a more complete understanding of the invention and its features and advantages, reference is now made to the following description, taken in conjunction with the accompanying drawings, in which.

DESCRIPTION OF PARTICULAR EMBODIMENT(S)

Figure 1:
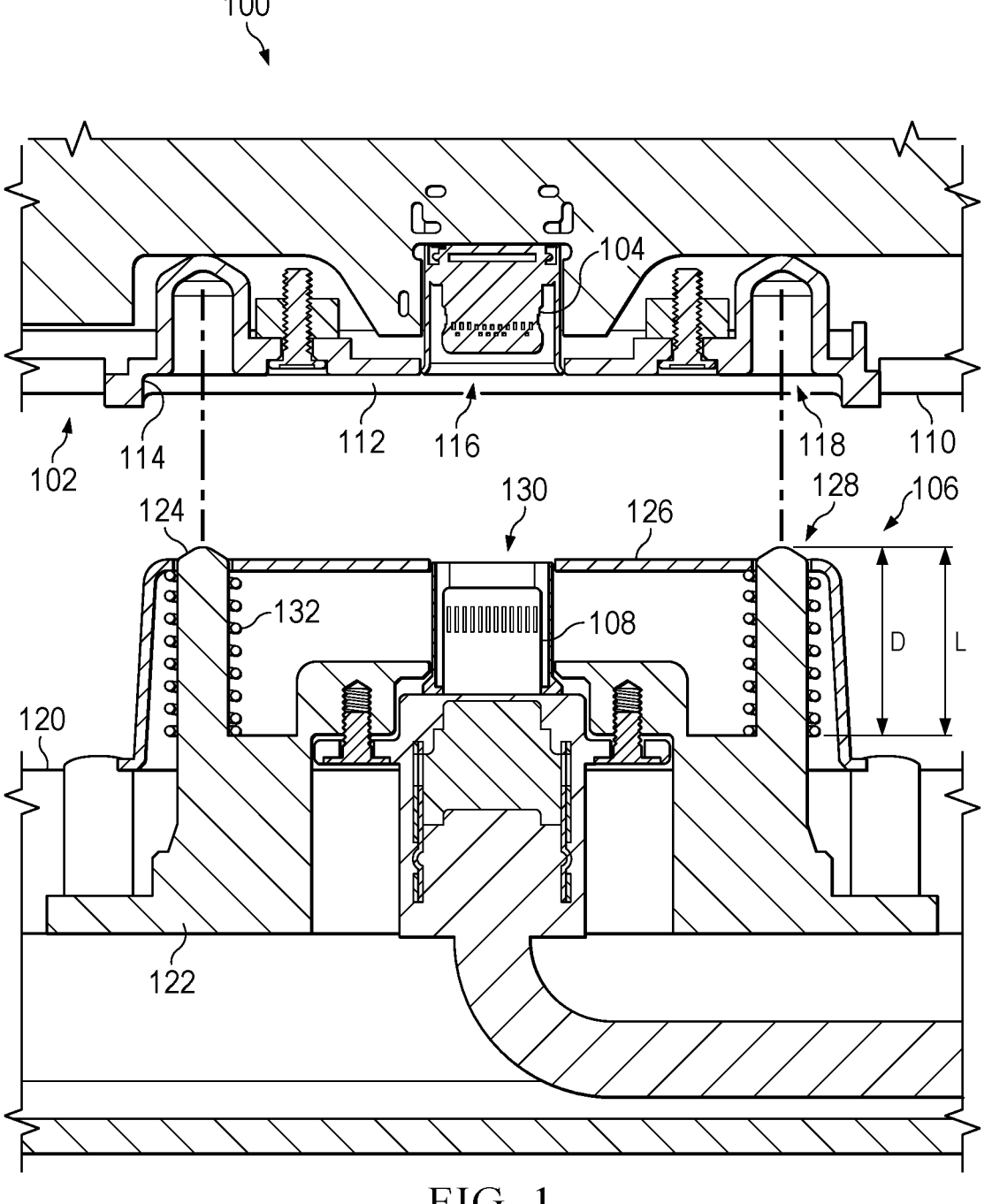
FIG. 1 is a partial cutaway side view of one embodiment of a system for docking a handheld device.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, pin "124" refers to an instance of a pin, which may be referred to collectively as pins "124" and any one of which may be referred to generically as pin "124."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a consumer electronic handheld device, a network storage handheld device, or another suitable handheld device and may vary in size, shape, performance, function-ality, and price. The information handling system may include memory, one or more processing resources such as a central processing unit (CPU) or hardware or software control logic. Additional components of the information handling system may include one or more storage handheld devices, one or more communications ports for communi-cating with external handheld devices as well as various input and output (I/O) handheld devices, such as a keyboard, a mouse, and one or more video displays. The information handling system may also include one or more buses oper-able to transmit communication between the various hard-ware components.

In some gaming systems, when a user wants to dock a handheld device (e.g., position the handheld device on a dock such that the handheld device is connected to the dock), the connection is a blind connection such that the user must guess when a device connector in the handheld device is aligned with a dock connector in the dock. In some other gaming systems, the connection is visible only at certain angles such that verifying the device connector is connected to the dock connector requires the user to look in small gaps or at selected angles to see the connection. In some of these systems, if the device connector is not aligned with the dock connector, one or both connectors may be damaged. The device connector and dock connector may not be aligned directionally (e.g., the user might not see the dock connector and be moving the handheld device left, right, forward or backward while trying to connect to the dock) or angularly (e.g., the user may be twisting the handheld device while trying to connect to the dock).

To ensure a secure connection between a device connector and a dock connector and prevent damage to either connec-tor, embodiments disclosed herein may be configured to ensure a handheld device is aligned with a dock before the device connector can connect to the dock connector. Par-ticular embodiments are best understood by reference to FIGS. 1-9, wherein like numbers are used to indicate like and corresponding parts.

Figure 2:
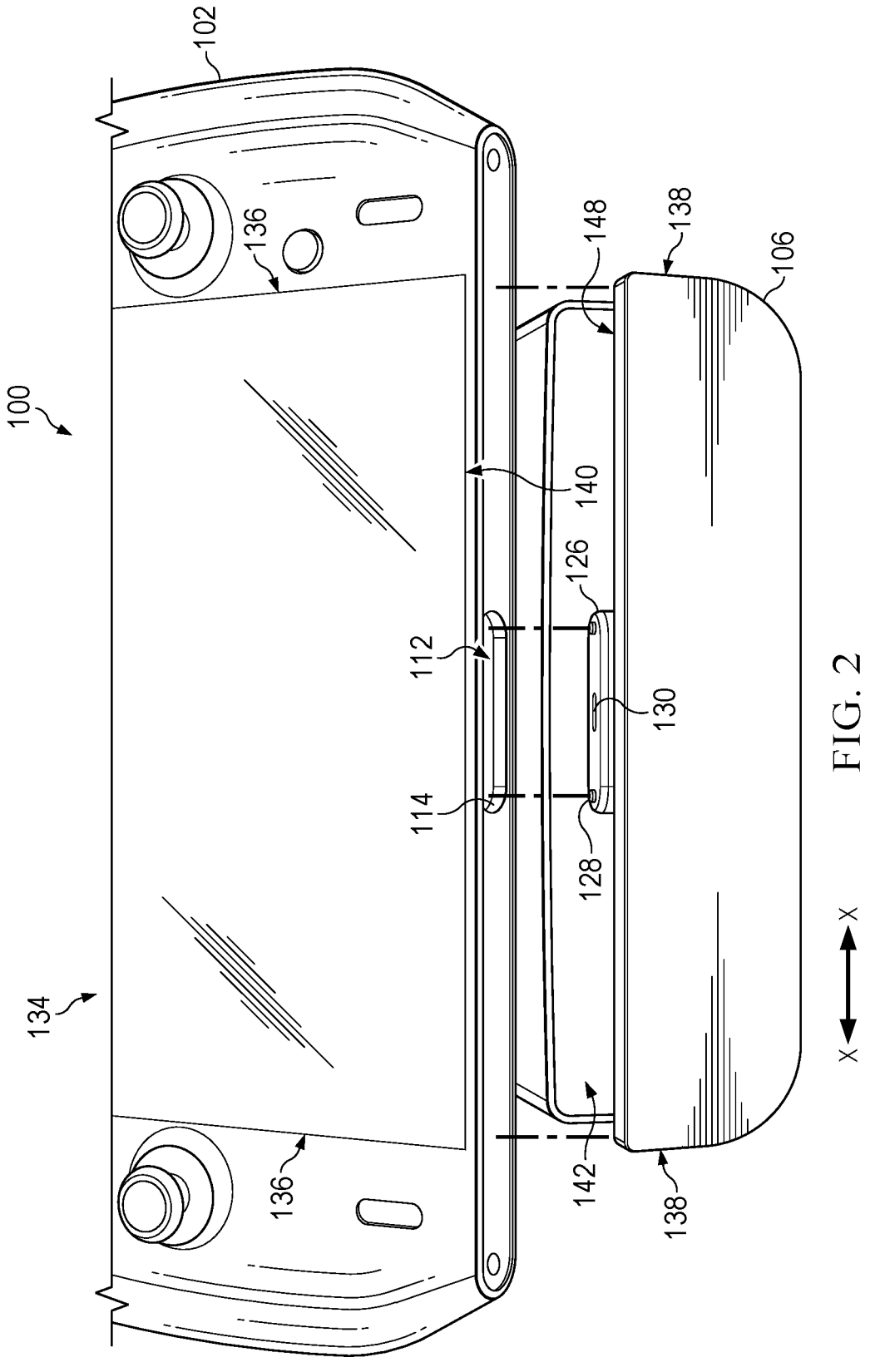
FIG. 2 is a partial perspective view of one embodiment of a system for docking a handheld device, illustrating the use of various features as visual cues for initial positioning of the handheld device on the dock relative to an X-X direction.

Referring to FIGS. 1 and 2, a system 100 for docking a handheld device 102 to dock 106 may comprise features on handheld device 102 (which may also be referred to as "handheld device" 102) for engaging with features on dock 106.

Handheld device 102 may comprise device housing 110 with cap recess 112 having inner surface 114, device con-nector opening 116 and a set of pin recesses 118. Device connector 104 may be located inside device housing 110, wherein device connector opening 116 allows access to device connector 104 but device housing 110 generally protects device connector 104 from damage.

Dock 106 may comprise dock housing 120, dock connec-tor 108 supported by connector support assembly 122, a set of pins 124, and cap 126 having dock connector opening 130 and pin openings 128 for the set of pins 124. Dock connector 108 may be accessible through dock connector opening 130 but may extend through dock connector opening 130, dis-cussed in greater detail below.

In some embodiments, as depicted in FIG. 1, the set of pins 124 may extend length L relative to connector support assembly 122. Cap 126 may be retracted a distance D such that a portion of the length L of pins 124 extend through pin openings 128, discussed in greater detail below. Pins 124 may have tapered ends 124A such that, as pins 124 extend through pin openings 128, tapered ends 124A ensure pins 124 extend into pin recesses 118 even if device connector 104 is not precisely aligned with dock connector 108, wherein contact between tapered ends 124A and pin recesses 118 may cause handheld device 102 to move or rotate slightly to help align device connector opening 116 with dock connector opening 130.

Springs 132 may be positioned on pins 124 and have a spring constant selected to bias cap 126 such that, in the absence of a compressive force applied to cap 126, dock connector 108 is recessed inside cap 126. In some embodi-ments, as depicted in FIG. 1, one or more of the length L of pins 124 or the spring constant of springs 132 may be configured such that pins 124 may extend at least partially through pin openings 128. In other embodiments, the length of pins 124 and/or the spring constant of springs 132 may be configured such that pins 124 do not extend through pin openings 128 (e.g., pins 124 may be flush with an outer surface of cap 126 or recessed inside cap 126).

General Alignment of Handheld Device to Dock

Figure 3:
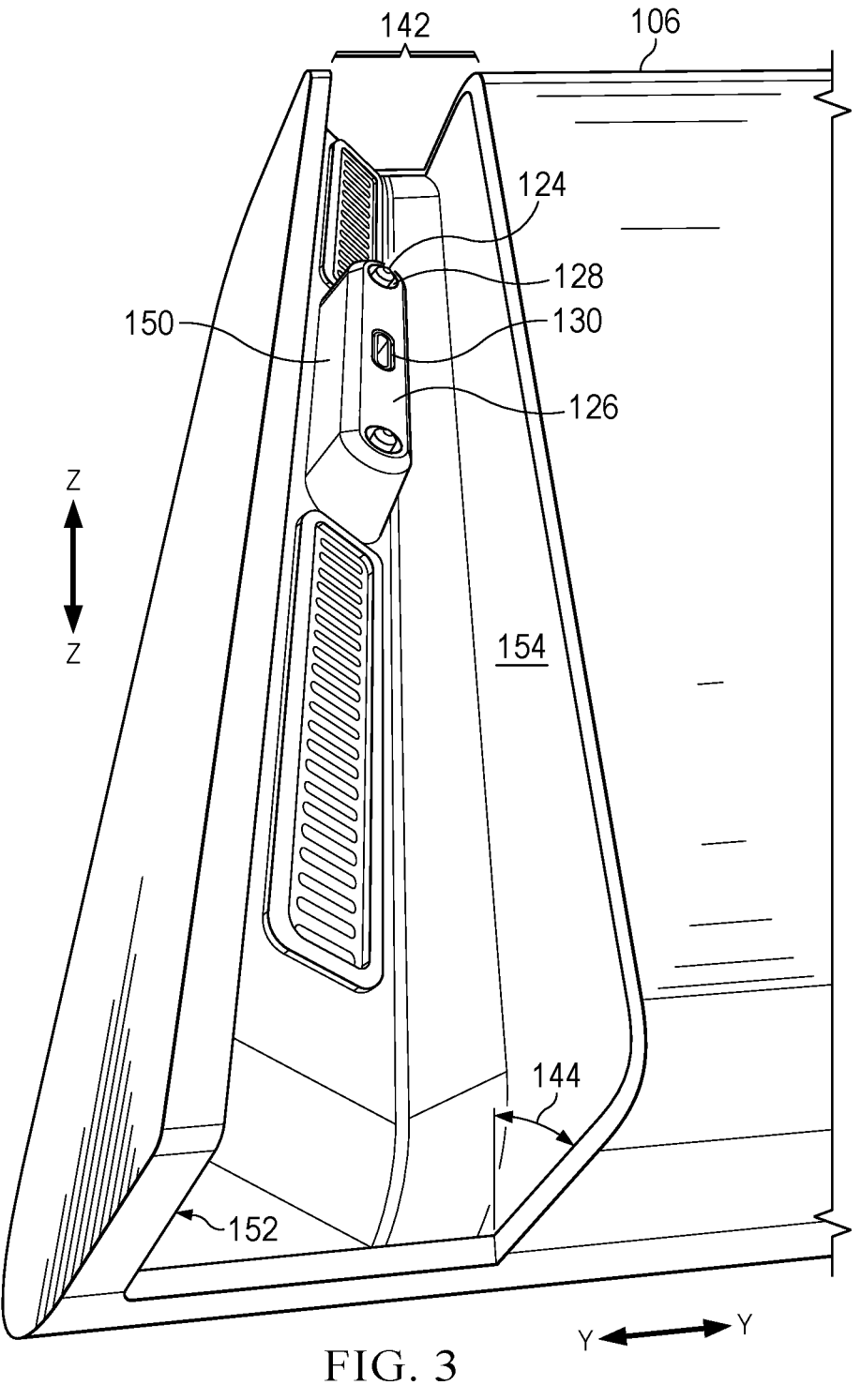
FIG. 3 is a partial end view of one embodiment of a system for docking a handheld device, illustrating the use of various features as visual cues for initial positioning of the handheld device on the dock relative to a Z-Z direction.

Referring to FIGS. 1, 2 and 3, handheld device 102 and dock 106 may include features for a user to generally align handheld device 102 relative to dock 106 while protecting device connector 104 and dock connector 108.

Referring to FIGS. 1 and 2, in some embodiments, handheld device 102 may have display 134 with display side edges 136 and display bottom edge 140, and dock 106 may have dock side edges 138 and dock top edge 148. Display side edges 136 and dock side edges 138 may help a user position handheld device 102 generally in slot 142 in the X-X direction without seeing dock connector 108. In some embodiments, display side edges 136 may help a user position handheld device 102 generally in slot 142 in the X-X direction such that device recess 112 is positioned to receive cap 126. Dock top edge 148 and display bottom edge 140 may allow a user to verify handheld device 102 is positioned with cap 126 in device recess 112. In some embodiments, when display side edges 136 are aligned with dock side edges 138 and display bottom edge 140 is parallel with (but separated by a gap) dock top edge 148, a user can easily verify handheld device 102 is positioned on dock 106 and generally aligned such that connection between device connector 104 and dock connector 108 can be attempted with minimal risk of damaging device connector 104 and/or dock connector 108.

Referring to FIGS. 1 and 3, slot 142 may be configured for holding handheld device 102 at angle 144 in dock 106, which may be any angle including a vertical angle and non-vertical angles. Springs 132 may bias cap 126 away from dock 106 such that pins 124 do not extend or extend only partially through pin openings 128. Outer surface 150 of cap 126 may be shaped (including tapered or beveled or curved edges) to facilitate a user positioning handheld device 102 in slot 142 with device recess 112 aligned with cap 126. Slot surfaces 152 and 154 may facilitate a user positioning handheld device 102 in slot 142 in the Y-Y direction and may be oriented at angle 144. A user may position handheld device 102 in slot 142 and generally align handheld device 102 relative to dock 106 in the X-X direction using display side edges 136 and dock side edges 138, wherein slot surfaces 152 and 154 may ensure handheld device 102 is generally aligned in the Y-Y direction and at angle 144. In some embodiments, handheld device 102 and dock 106 may be configured such that, when handheld device 102 is generally aligned with dock 106, a user is able to apply a force generally in the Z-Z direction to connect device connector 104 with dock connector 108, wherein one or more of device housing 110 in contact with slot surfaces 152 and 154, cap 126 positioned in device recess 112, and pins 128 extending through pin openings 128 and into pin recesses 118 prevent unwanted movement or twisting of handheld device 102 relative to dock 106 that could damage device connector 104 or dock connector 108.

Figure 4:
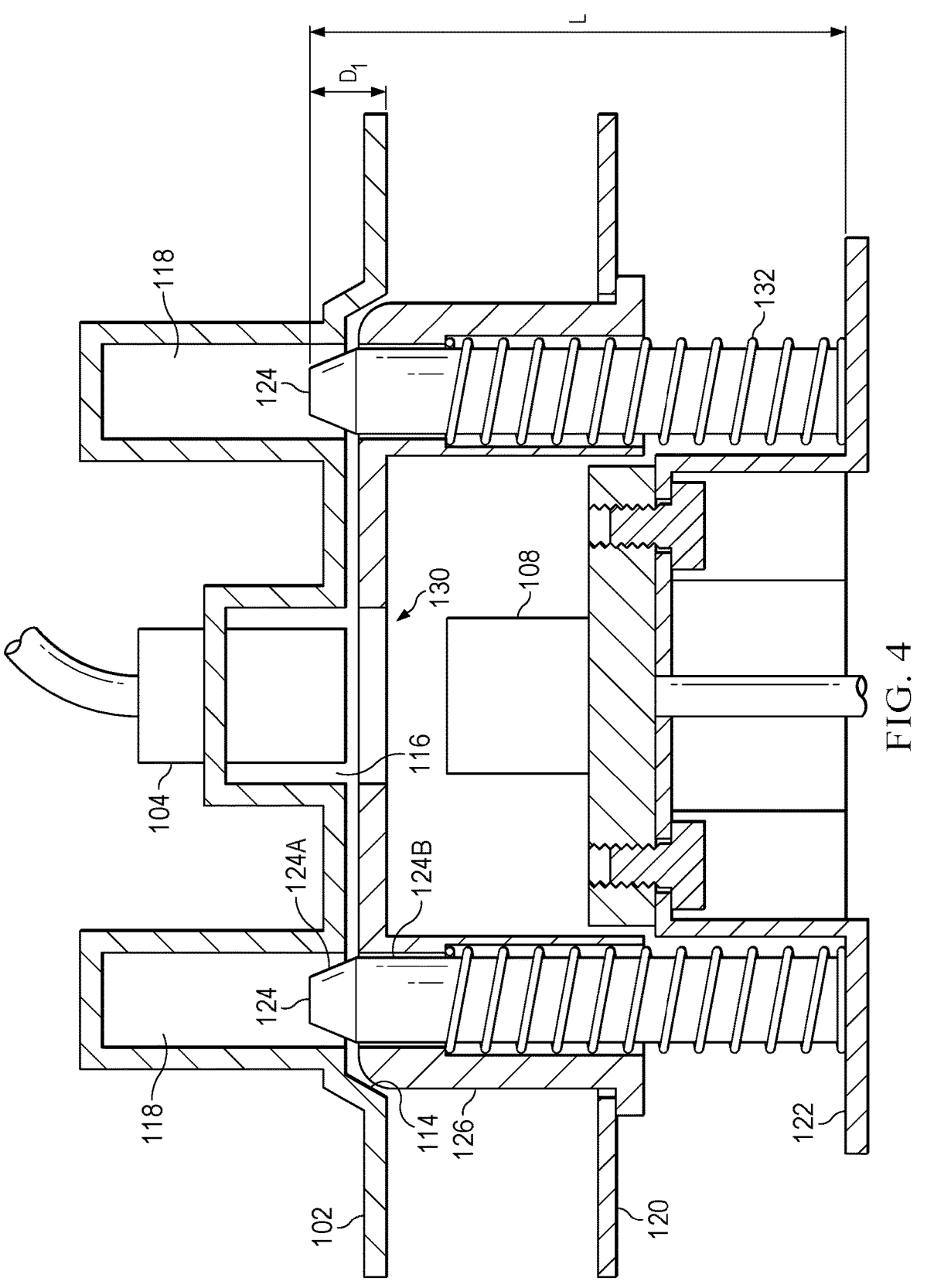
FIG. 4 is a partial cutaway side view of one embodiment of a system for docking a handheld device, illustrating the handheld device positioned on the dock with a set of pins extending partially into pin recesses in the handheld device and a cap protecting a dock connector.

Referring to FIG. 4, when handheld device 102 is positioned in slot 142 and inner surface 114 of handheld device 102 is in contact with outer surface 150 of cap 126, pins 124 may be generally aligned with pin recesses 118 and connector opening 116 may be generally aligned with dock connector opening 130. In this configuration, device connector 104 may be recessed in device housing 110 and dock connector 108 may be recessed in dock housing 120 to prevent damage to either connector.

Fine Alignment

When cap 126 is positioned inside device recess 112 and a compressive force is applied to handheld device 102 to advance handheld device 102 into dock 106, springs 132 may be compressed such that cap 126 may retract a portion of distance D (e.g., first distance D1) to cause pins 124 to extend from pin openings 128. In some embodiments, springs 132 may be configured with a spring constant such that the weight of handheld device 102 is sufficient to compress springs 132 and retract cap 126 the first distance D1. In some embodiments, springs 132 have a spring constant selected such that a user must supply a force sufficient to compress springs 132 and retract cap 126 the first distance D1. In some embodiments, pins 124 may extend length L from a base of connector support assembly 122 (e.g., pins 124 as depicted in FIG. 4 may be longer than pins 124 as depicted in FIG. 1). In some embodiments, a set of pins 124 with a longer length L may have pin walls 124B configured with greater tolerances for ease of positioning of handheld device 102 in dock 106 but the additional length of pins 124 extending into pin recesses 118 may provide fine alignment of device connector 104 relative to dock connector 108.

Figure 5:
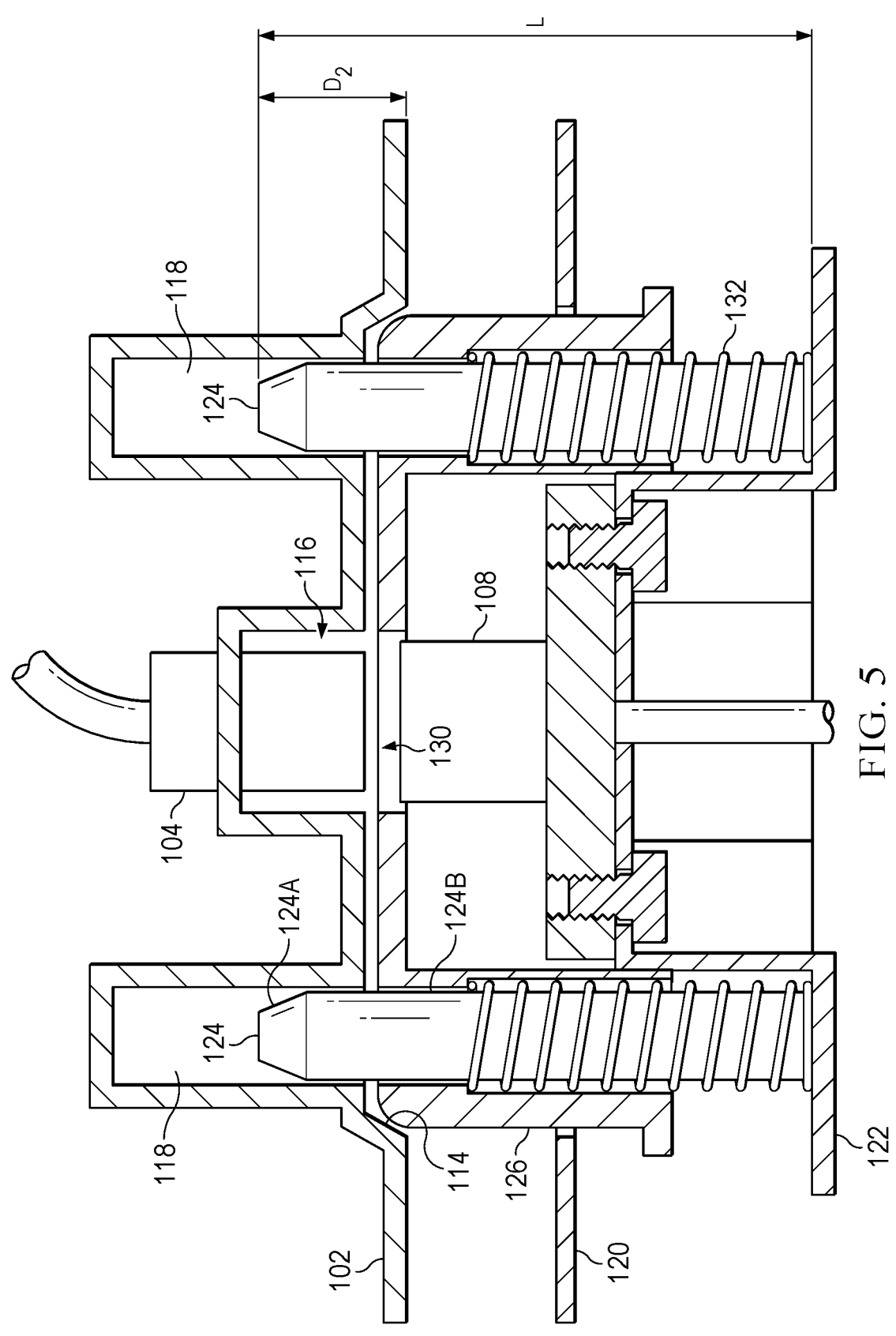
FIG. 5 is a partial cutaway side view of one embodiment of a system for docking a handheld device, illustrating the handheld device positioned on the dock with the set of pins extending partially into the pin recesses to align a device connector in the handheld device onto the dock connector.

Referring to FIG. 5, when a compressive force is applied to handheld device 102 to further compress springs 132 and further retract cap 126 a second portion of distance D (e.g., second distance D2), pins 124 may extend further through pin openings 128 and into pin recesses 118 such that dock connector 108 may be safely extended through dock connector opening 130 but still be protected from damage caused by misaligned device connector 104 and/or dock connector 108. In some embodiments, as handheld device 102 is advanced and cap 126 is retracted a larger portion of distance D (e.g., distance D2), pins 124 may extend further into pin recesses 118, wherein tolerances between pin walls 124B and pin recesses 118 restrict or prevent movement of handheld device 102 in the X-X direction and/or prevent rotation of handheld device 102 that could result in damage to device connector 104 or dock connector 108. In some embodiments, springs 132 have a spring constant selected such that the weight of handheld device 102 is sufficient to compress springs 132 and retract cap 126 a second distance D2. In some embodiments, springs 132 have a spring constant selected such that a user must supply a force sufficient to compress springs 132 and retract cap 126 the second distance D2.

Seated Connection

Figure 6:
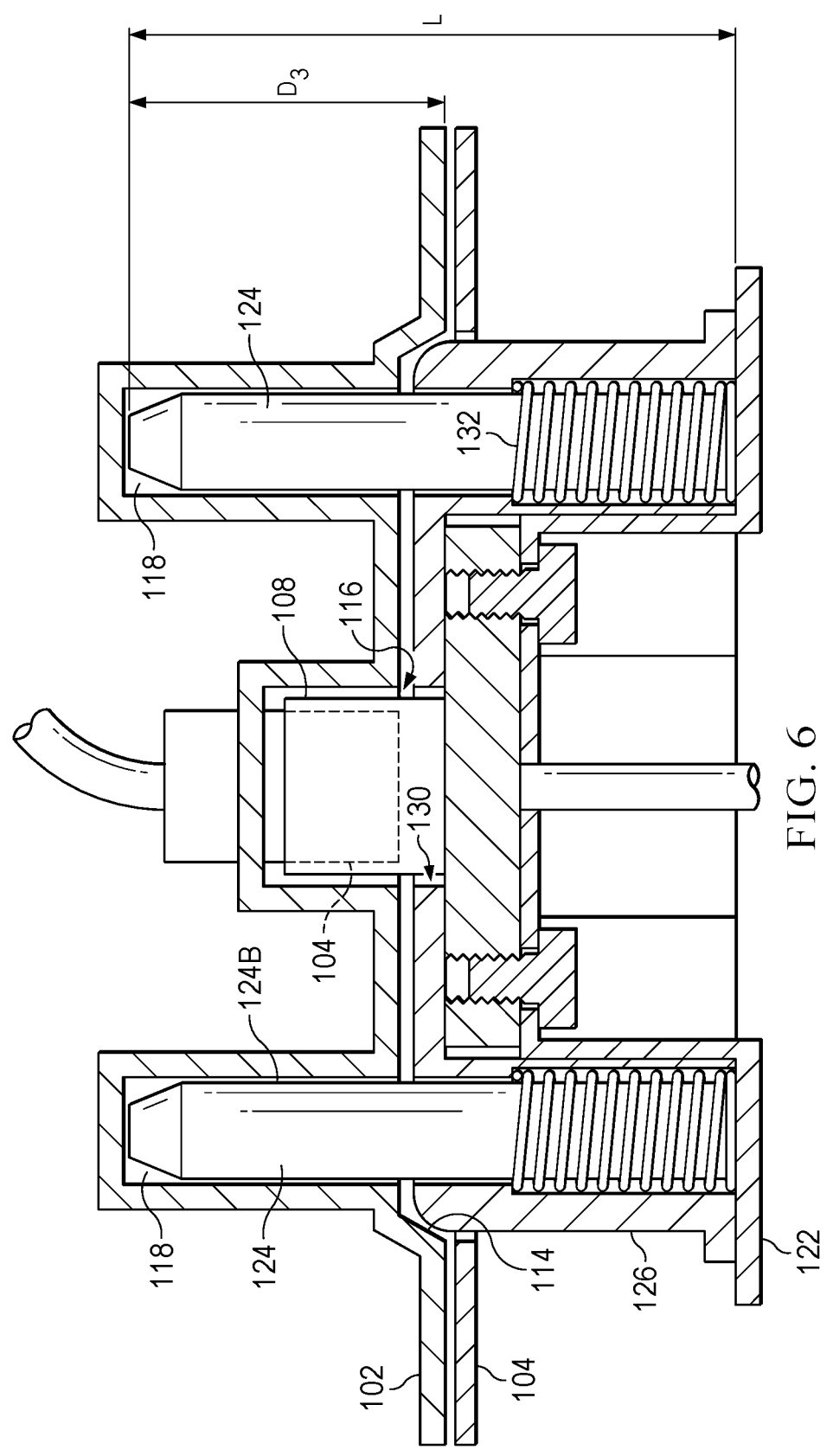
FIG. 6 is a partial cutaway side view of one embodiment of a system for docking a handheld device, illustrating the handheld device positioned on the dock with the set of pins extending fully into the pin recesses and the device connector connected to the dock connector.

Referring to FIG. 6, when handheld device 102 is seated on dock 106 such that cap 126 is positioned in device recess 112 and retracted a greater portion of distance D (e.g., retracted to distance D3) and pins 124 extend through pin openings 128 and into pin recesses 118, a compressive force may be applied to handheld device 102 to extend dock connector 108 through dock connector opening 130 and into connector opening 116, wherein device connector 104 may be connected to dock connector 108. In some embodiments, as handheld device 102 is advanced a distance D3, pins 124 extend fully into pin recesses 118 as device connector 104 is connected to dock connector 108, wherein pins 124 in pin recesses 118 prevent movement of handheld device 102 in the X-X direction and/or prevent rotation of handheld device 102 to prevent damage to device connector 104 or dock connector 108. In some embodiments, springs 132 have a spring constant selected such that the weight of handheld device 102 is sufficient to compress springs 132 and retract cap 126 the third distance D3. In some embodiments, springs 132 have a spring constant selected such that a user must supply a force sufficient to compress springs 132 to retract cap 126 the third distance D3 and connect device connector 104 to dock connector 108. In this configuration, handheld device 102 may be considered seated in dock 106.

Visual Verification is Possible

Figure 7:
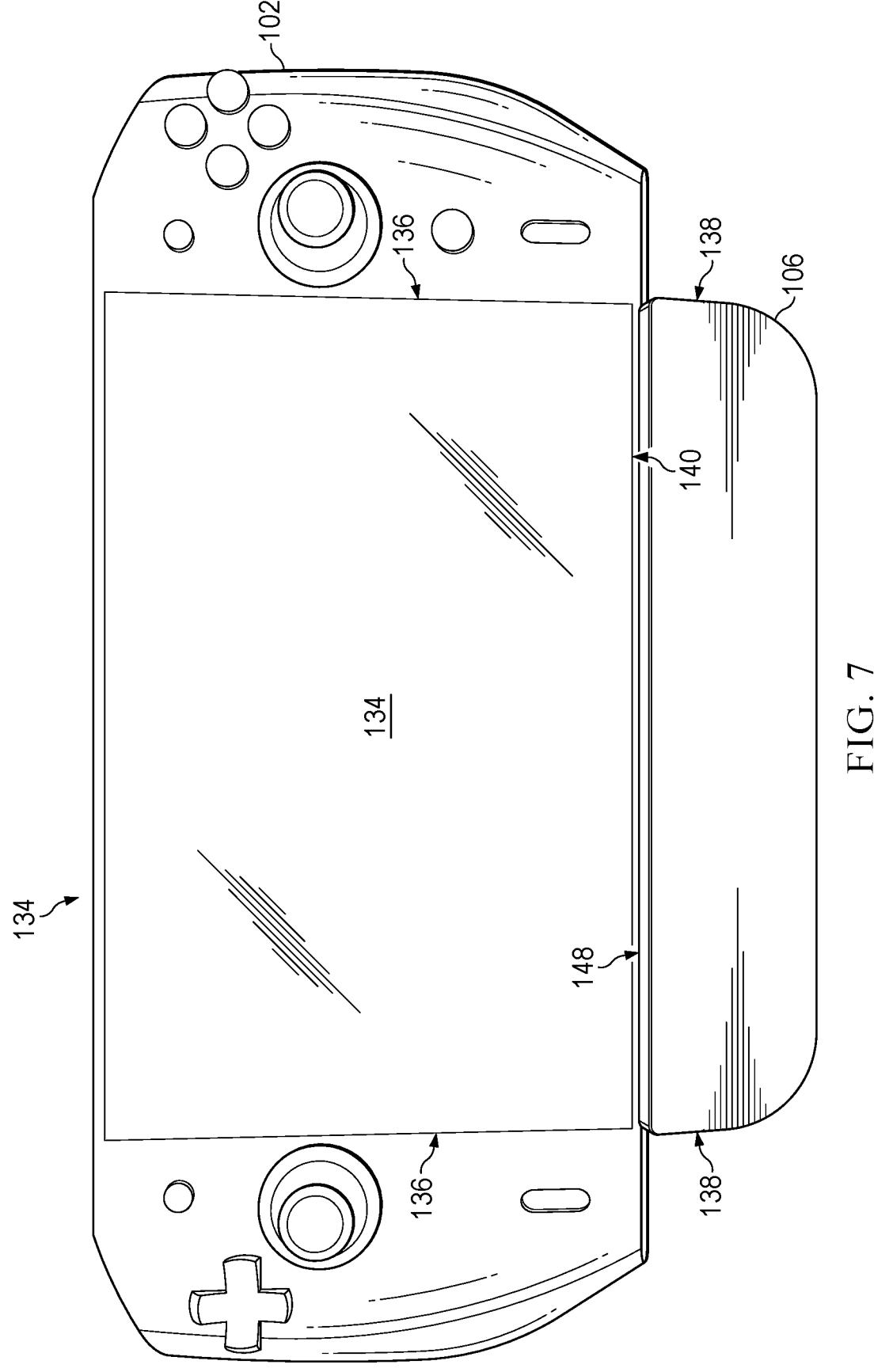
FIG. 7 is a perspective view of one embodiment of a system for docking a handheld device, illustrating various features for verifying the handheld device is aligned on the dock and/or the device connector is connected to the dock connector.

A user may want to verify handheld device 102 is connected to dock 106 without twisting, pulling or pushing on handheld device 102. Referring to FIG. 7, in some embodiments, when handheld device 102 is seated on dock 106, display side edges 136 may be aligned with dock side edges 138 to indicate handheld device 102 and dock 106 are aligned in the X-X direction. In some embodiments, when handheld device 102 is seated in dock 106, display bottom edge 140 may be parallel to dock top edge 148. In some embodiments, display bottom edge 140 may contact dock top edge 148 or be separated from dock top edge 148 by a small, uniform gap.

Figure 8:
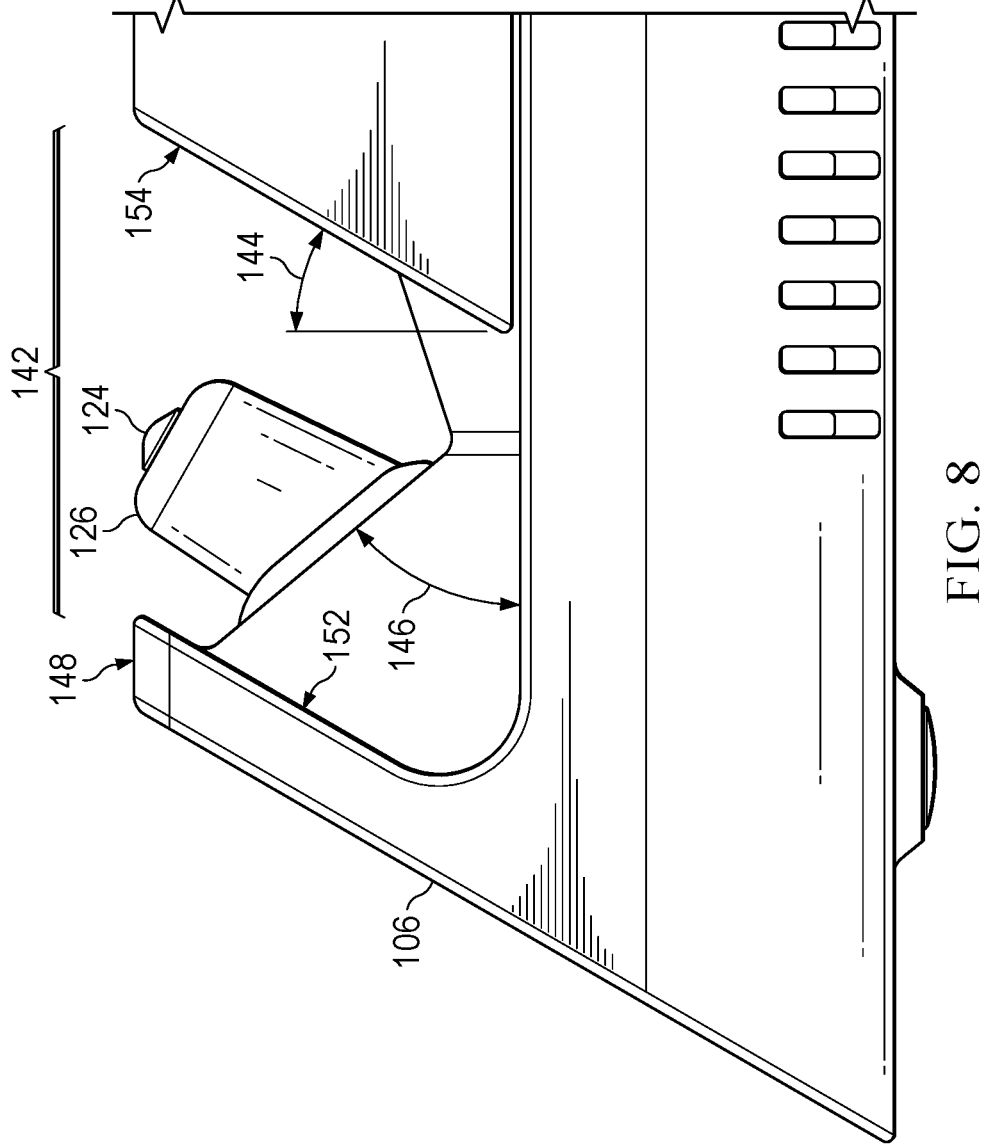
FIG. 8 is a partial end view of one embodiment of a system for docking a handheld device, illustrating the dock connector angle and the handheld device angle.

Referring to FIG. 8, embodiments may allow handheld device 102 to be positioned in dock 106 at slot angle 144. In some embodiments, slot 142 may be associated with surfaces 152 and 154 at slot angle 144 for orienting handheld device 102 at a preferred viewing angle for a user, and cap 126 may be oriented at a cap angle 146 for a preferred configuration of components in handheld device 102. Since handheld device 102 and dock 106 have features to assist a user with visually aligning handheld device 102 with dock 106 and/or features for ensuring handheld device 102 is aligned with dock 106 before device connector 104 is allowed to connect to dock connector 106, cap angle 146 is not restricted to being the same angle as slot angle 144.

Figure 9:
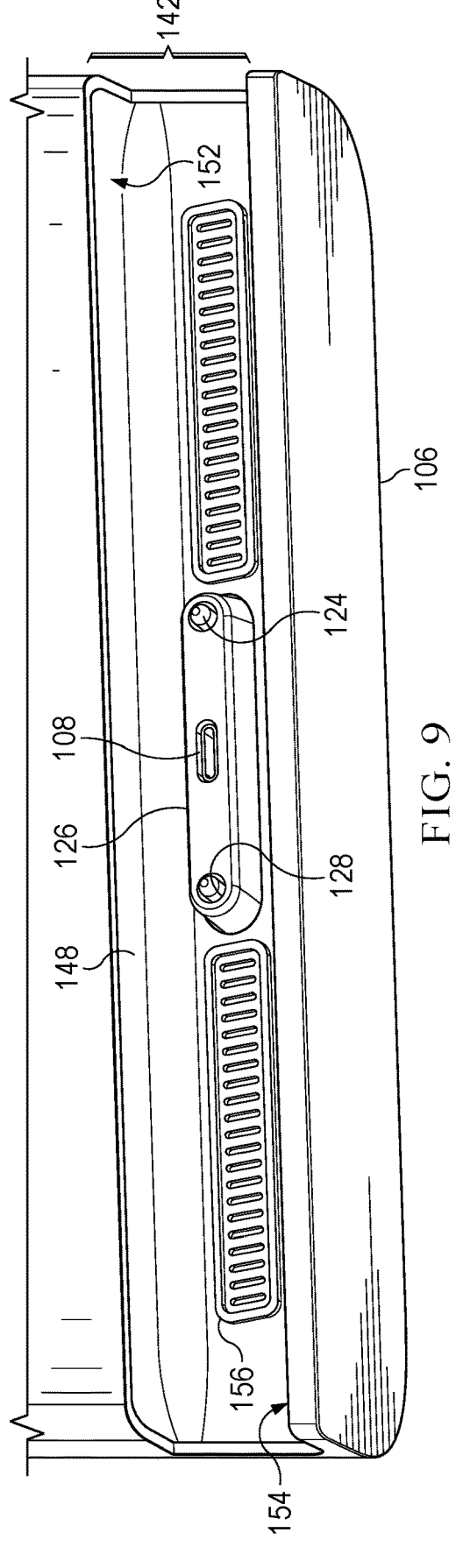
FIG. 9 depicts a partial back view of one embodiment of a system for docking a handheld device.

Referring to FIG. 9, embodiments may allow additional features for improved performance. In some embodiments, dock 106 may comprise vent 156 in slot 142, wherein, when handheld device 102 is seated in dock 106 such that device connector 104 is connected to dock connector 108, vent 156 (including the number, size or orientation of openings in vent 156 relative to openings in handheld device 102) may provide improved cooling of dock 106 and/or handheld device 102. A user does not need to align handheld device 102 relative to vent 156 or be concerned with vent 156 damaging device connector 104 since device connector 104 is recessed in device housing 110.

The above disclosed subject matter is to be considered illustrative, and not restrictive, and the appended claims are intended to cover all such modifications, enhancements, and other embodiments which fall within the true spirit and scope of the disclosure. Thus, to the maximum extent allowed by law, the scope of the disclosure is to be determined by the broadest permissible interpretation of the following claims and their equivalents, and shall not be restricted or limited by the foregoing detailed description.

The invention claimed is:

1. A docking system comprising: a dock comprising: a dock housing; a first surface and a second surface both extending from the dock housing, the second surface spaced-apart from the first surface, the first surface and the second surface defining a slot therebetween, the slot defining a non-zero slot angle less than 90 degrees with respect to the dock housing; a dock connector positioned within the slot; a set of pins positioned within the slot; a cap positioned within the slot, the cap orientated at a non-zero cap angle less than 90 degrees with respect to the dock housing, the cap angle differing from the slot angle, comprising: a set of pin openings; and a dock connector opening for access to the dock connector; and a spring configured with a spring constant to bias the cap such that the dock connector is recessed in the cap, wherein the dock further comprises a third surface extending from the first surface and within the slot, wherein the cap extends from the third surface and within the slot, wherein a distal end of the cap is non-parallel to the third surface; and a handheld device comprising: a device connector; and a device housing comprising: a device connector opening for access to the device connector; and a set of pin recesses for receiving the set of pins, the handheld device configured to be coupled to the dock and positioned within the slot at the slot angle.

2. The docking system of claim 1, wherein the spring is configured with the spring constant to bias the cap such that the set of pins are flush with the set of pin openings when no force is applied.

3. The docking system of claim 2, wherein the spring is configured such that a force compresses the spring to retract the cap a first distance to cause the set of pins to extend at least partially through the set of pin openings.

4. The docking system of claim 3, wherein the spring is configured with the spring constant such that the force compresses the spring to retract the cap a second distance to cause the dock connector to extend at least partially through the dock connector opening.

5. The docking system of claim 4, wherein the spring is configured with the spring constant such that the force compresses the spring to retract the cap a third distance to cause the dock connector to extend at least partially through the device connector opening.

6. The docking system of claim 5, wherein the spring is configured with the spring constant such that the force compresses the spring to retract the cap a fourth distance and connects the device connector to the dock connector.

7. The docking system of claim 1, wherein each pin of the set of pins comprises a tapered end.

8. The docking system of claim 1, further comprising a set of visual features for aligning the device housing relative to the cap.

9. The docking system of claim 8, wherein the set of visual features for aligning the device housing relative to the cap comprises one or more of a display side edge and a dock side edge, wherein aligning the device housing relative to the cap comprises aligning the display side edge relative to the dock side edge.

10. The docking system of claim 1, wherein the device housing comprises a device recess for receiving the cap.

11. A method for connecting a device connector in a handheld device with a dock connector in a dock, the method comprising: positioning a device housing of the handheld device relative to a cap in a slot in the dock, the dock having a dock housing and a first surface and a second surface both extending from the dock housing, the second surface spaced-apart from the first surface, the first surface and the second surface defining the slot therebetween, the slot having a non-zero slot angle less than 90 degrees with respect to a dock housing of the dock, the dock further comprises a third surface extending from the first surface and within the slot, wherein the cap extends from the third surface and within the slot, wherein a distal end of the cap is non-parallel to the third surface, wherein: the cap comprises a dock connector opening for accessing the dock connector, a set of pins, a set of pin openings and a spring configured to bias the cap such that the dock connector is recessed in the cap, the cap orientated at a non-zero cap angle less than 90 degrees with respect to a dock housing of the dock, the cap angle differing from the slot angle; and the device housing comprises a set of pin recesses and a device connector opening for accessing the device connector; and applying a force to cause the cap to retract a distance such that the set of pins extend through the set of pin openings and into the set of pin recesses and cause the dock connector to extend through the dock connector opening and the device connector opening to connect the device connector to the dock connector such that the handheld device is be coupled to the dock and positioned within the slot at the slot angle.

12. The method of claim 11, wherein applying the force comprises:

applying a first force to retract the cap a first distance to cause the set of pins to extend through the set of pin openings and at least partially into the set of pin recesses in the device housing;

applying a second force to retract the cap a second distance to cause the dock connector to extend through the dock connector opening and into the device connector opening; and applying a third force to retract the cap a third distance to cause the device connector to connect to the dock connector.

13. The method of claim 12, wherein the spring is configured with the spring constant selected such that a weight of the handheld device applies the first force.

14. The method of claim 13, wherein the spring is configured with the spring constant selected such that the weight of the handheld device applies the second force.

15. The method of claim 14, wherein the spring is configured with the spring constant selected such that the weight of the handheld device applies the third force.

16. The method of claim 11, wherein the spring is configured with a spring constant selected for positioning the cap with the set of pins not extending from the set of pin openings when the device housing is not positioned on the cap.

17. The method of claim 11, wherein the device housing comprises a device recess, wherein positioning the device housing in the slot comprises positioning the cap in the device recess.

\* \* \* \* \*